(12) United States Patent
Bishop et al.

(10) Patent No.: US 10,458,459 B2
(45) Date of Patent: Oct. 29, 2019

(54) PRECISION HOLDING AND LOCATING PIN

(71) Applicant: Mitee-Bite Products LLC, Center Ossipee, NH (US)

(72) Inventors: David Bishop, Center Conway, NH (US); Kevin Glover, Moultonboro, NH (US)

(73) Assignee: MITEE-BITE PRODUCTS LLC, Center Ossipee, NH (US)

( * ) Notice: Subject to any disclaimer, the term of this patent is extended or adjusted under 35 U.S.C. 154(b) by 105 days.

(21) Appl. No.: 15/496,216

(22) Filed: Apr. 25, 2017

(65) Prior Publication Data

US 2018/0306232 A1   Oct. 25, 2018

(51) Int. Cl.
| | |
|---|---|
| *F15B 13/12* | (2006.01) |
| *F16B 39/284* | (2006.01) |
| *F16B 5/02* | (2006.01) |
| *F16B 13/12* | (2006.01) |
| *F16B 2/04* | (2006.01) |
| *F16B 5/06* | (2006.01) |
| *F16B 37/12* | (2006.01) |

(52) U.S. Cl.
CPC .......... *F16B 39/284* (2013.01); *F16B 5/0258* (2013.01); *F16B 13/124* (2013.01); *F16B 2/04* (2013.01); *F16B 5/0642* (2013.01); *F16B 37/122* (2013.01)

(58) Field of Classification Search
CPC ...................................................... F16B 13/124
USPC ................................ 411/55, 60.1, 60.2, 60.3
See application file for complete search history.

(56) References Cited

U.S. PATENT DOCUMENTS

| | | | | | |
|---|---|---|---|---|---|
| 2,696,765 | A | * | 12/1954 | Appleton | B23Q 3/102 269/152 |
| 3,785,746 | A | * | 1/1974 | Wolf | B23B 29/025 408/182 |
| 4,408,937 | A | * | 10/1983 | Hainke | F16B 13/06 411/42 |
| 4,447,183 | A | * | 5/1984 | Yunt | F16B 5/02 411/107 |
| 5,391,023 | A | * | 2/1995 | Basteck | B23D 77/08 408/146 |
| 6,619,892 | B2 | * | 9/2003 | Enquist | B23B 27/1655 407/36 |
| 7,114,890 | B2 | * | 10/2006 | Noggle | B23C 5/2441 407/36 |
| 7,150,595 | B2 | * | 12/2006 | Liebig | F16B 13/066 411/60.3 |
| 2002/0176763 | A1 | * | 11/2002 | Lin | F16B 13/06 411/178 |

* cited by examiner

*Primary Examiner* — Flemming Saether
(74) *Attorney, Agent, or Firm* — Dunlap Bennett & Ludwig PLLC; Brendan E. Squire (57) ABSTRACT

A readily removable expanding precision holding and locating pin for securing parts to a work surface or assembly. This device works equally well as a threaded in insert with controlled fit counter bore, press fit or controlled fit bore, a taper fit etc. allowing the device to be used in many standard fixtures without modification the fixture, for example, tombstone fixtures mounted on horizontal machining centers. The device itself can be furnished as an oversize mandrel that can be machined to less than 50% of its original diameter. The device holds and can position in the X, Y, Z, directions and also resists rotation along the C/L Axis.

9 Claims, 7 Drawing Sheets

PRECISION HOLDING AND LOCATING PIN

BACKGROUND OF THE INVENTION

The present invention relates to apparatus for positioning parts for machining operations and, more particularly, to expansion pins for mounting or locating a workpiece for machining.

Typically to position and hold a component for machining a large vise must be used or a specialized fixture must be built using locating pins in conjunction with other fasteners. Bolts must be completely removed when changing parts or pallets, which can take significant time, particularly for precision machine thread bolts. Also, if a bolt is dropped during mounting or removal, time is taken away from manufacturing.

Often space is limited, and geometry prevents installation. Multiple components must be used to achieve the same results. Other devices are generally far more complex and expensive.

Other expanding pins most often require specialized preparation to install, tedious to install, have no or limited ability to be modified to hold smaller parts, are multi-piece assemblies, difficult to manufacture and prone to malfunction due to debris entry, rust and contamination.

This device works equally well as a threaded in insert with controlled fit counter bore, press fit or controlled fit bore, a taper fit etc. allowing the device to be used in many standard fixtures without modification the fixture, for example, tombstone fixtures mounted on horizontal machining centers. The device itself can be furnished as an oversize mandrel that can be machined to less than 50% of its original diameter. The device holds and can position in the X, Y, Z, directions and also resists rotation along the C/L Axis.

As can be seen, there is a need for a self-contained expansion pin that can remain affixed to a work station while permitting the easy switching of a workpiece.

SUMMARY OF THE INVENTION

In one aspect of the present invention, an expansion pin, for securing or mounting a part or workpiece includes a cylindrical body having a sidewall and an interior cavity extending from a top end towards a bottom end of the cylindrical body. A plurality of slots are defined in a top end of the cylindrical body and radially emanate from the interior cavity through the cylindrical sidewall. The slots define a plurality of gripping fingers around the circumference of the sidewall to hold the part or workpiece. A tapered surface portion converges inwardly along an interior face of the gripping fingers. A bolt having a frusto-conical head that converges inwardly from a top end of the bolt and terminates at a shank of the bolt. The shank has a plurality of external threads, wherein the frusto-conical head urges the plurality of griping fingers radially outwardly when the bolt is threadingly tightened to draw the frusto-conical head within the cylindrical body. The gripping fingers resiliently return to a resting condition when the bolt is threadingly loosened.

In some embodiments an annular expansion groove is defined around the cylinder at a terminus of the slots. A plurality of external mounting threads may extend from the bottom end of the cylindrical body. A plurality of the internal threads may be defined in the internal cavity. A polygonal surface may be defined in the interior cavity below the tapered surface portion. The polygonal surface may also be defined between the tapered surface portion and an internal threads defined in the internal cavity. The polygonal surface is configured to receive a tightening tool.

In some embodiments, an outer surface of the cylindrical body is substantially smooth, while in others an outer surface of the cylindrical body has a knurled texture.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an improved expansion pin for retaining or locating a work piece to a work surface, such as for machining of the work piece. The present invention is aime saving device which securely holds and precisely locates components on a fixture, grid plate or threaded tombstone quickly & easily while providing tooling access on 5 sides of the work piece. The device can be used by itself, as a pair, or in multiple, depending on the size and nature of the workpiece to be secured.

Figure 1:
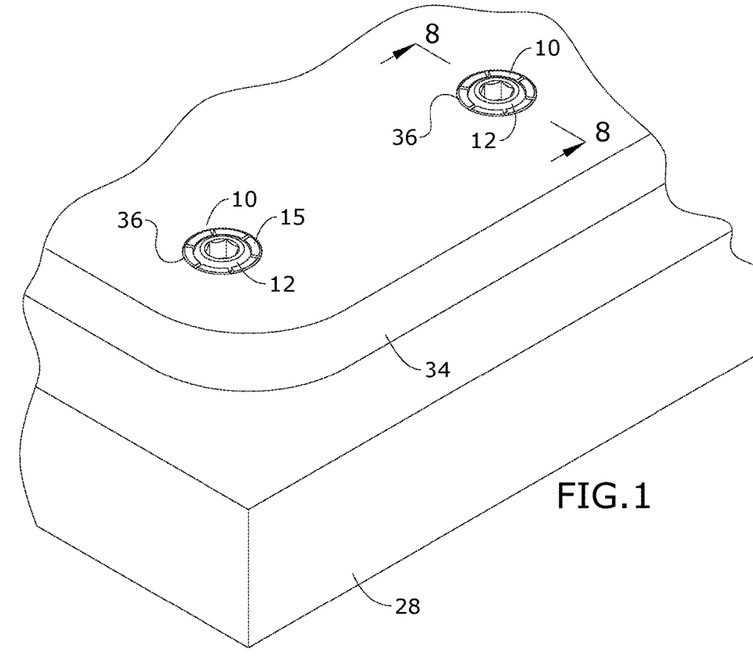
FIG. 1 is a perspective view of an embodiment of an expansion pin, shown in use.
Figure 2:
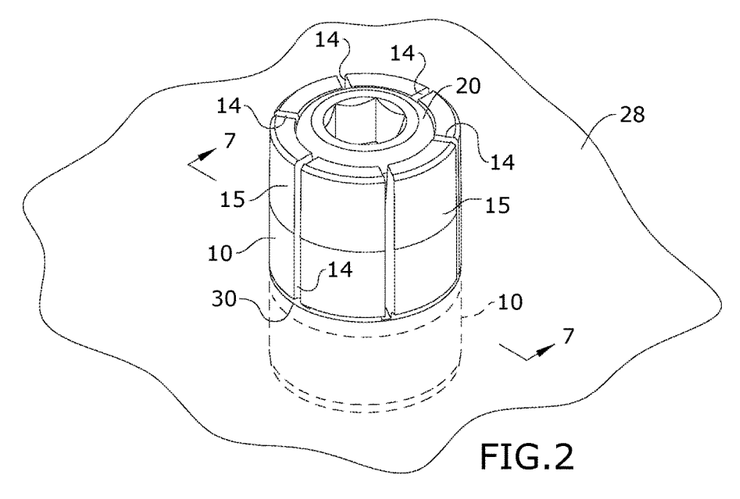
FIG. 2 is a perspective view the expansion pin, shown in an installed position.
Figure 3:
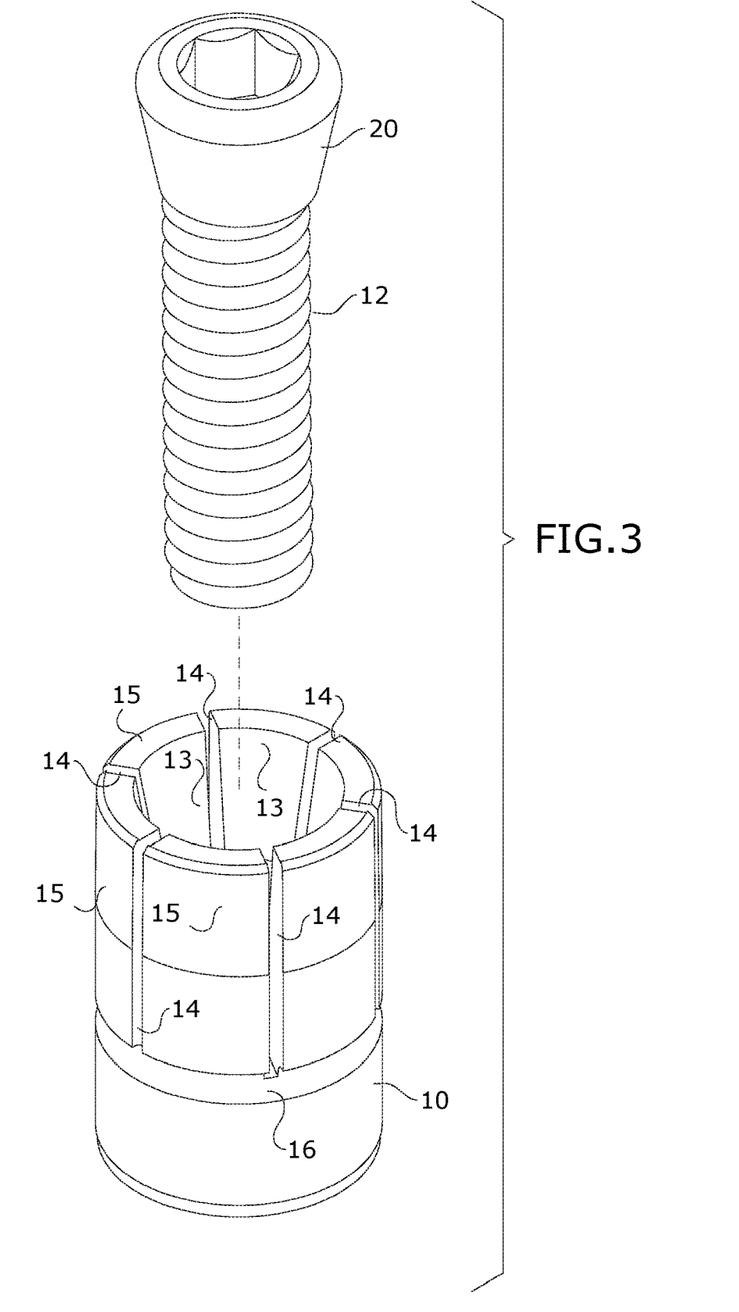
FIG. 3 is an exploded view the expansion pin.

As seen in reference to FIG. 1, a work surface 28 is shown supporting a work piece, or part 32 that requires machining or other operations to be performed. One or more apertures 36 are formed in the work piece or part to facilitate holding of the workpiece 34 during machining, and may later be utilized in mounting or assembling the workpiece 34 in its intended use. The expansion pin includes a cylindrical body 10 that receives a bolt 12. The rotational tightening of the bolt 12 within the cylindrical body 10 urges an outer surface against the aperture 36 to hold the workpiece 34 to the work surface 28.

As seen in reference to the drawings of FIGS. 1-13, an expansion pin according to aspects of the invention may be formed as a cylindrical body 10 having a sidewall. An interior cavity extends from a top end of the cylindrical body 10 towards a bottom end of the cylindrical body 10. A plurality of slots 14 are defined in a top end of the cylindrical body 10 and radially emanate from the interior cavity through an outer surface of the cylindrical sidewall. The slots 14 define a plurality of radially expanding gripping fingers 15 around the circumference of the sidewall. The gripping fingers 15 are configured to hold a workpiece 34 to a work table 28. A tapered surface 13 is formed on an interior face of the gripping fingers 15, such that the tapered surface 13 converges inwardly along an interior face of the gripping fingers 15.

A bolt 12 having a frusto-conical head 20 is threadingly draw within the cylindrical body 10 expansion pin, such that when the bolt 12 is tightened, the gripping fingers 15 are urged radially outwardly to engage with the aperture 36 of a workpiece 34 and retain the workpiece 34 to a machining table 28 or fixture. The frusto-conical head 20 has sides that converge inwardly from a top end of the bolt 12 and terminate at a shank, or shaft, of the bolt 12. The frusto-conical head 20 is dimensioned to have an outer diameter and surface that correspond to an inner diameter of the tapered surfaces 13 of the gripping fingers 15. The shank is also configured with a plurality of external threads 12 that may be threadingly received with the internal threads 32 of the work table 28. In some embodiments the external threads 12 may cooperatively engage with internal threads 18 extending into the cylindrical body 10. The external threads 12 may extend along an entire or a partial length of the shank.

In operation, the frusto-conical head 20 urges against the tapered surfaces 13 of the the gripping fingers 15 such that the gripping fingers 15 flex radially outwardly when the bolt 12 is tightened to draw the frusto-conical head 20 within the cylindrical body 10. In this regard the wider portion of the frusto-conical head 20 is drawn into the narrowing portion of the tapered faces to exert the radial force on the gripping fingers 15. When the bolt 12 is turned in a loosening direction, the frusto-conical head 20 is retracted to permit the gripping fingers 15 to flex inwardly. As will be appreciated the materials selected for the cylindrical body 10 should have sufficient resiliency that the gripping fingers 15 return to their resting state upon loosening of the frusto-conical head 20 from within the tapered surface 13 of the gripping fingers 15. An annular expansion groove 16 may be formed around the outer surface of the cylindrical body 10 at the terminal ends of the slots 14 to facilitate flexing of the gripping fingers 15 and to resist fracturing along the slots 14 into the cylindrical body 10.

Figure 12:
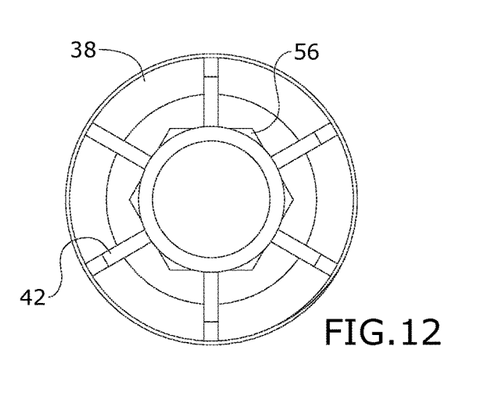
FIG. 12 is a top view of pin body 38.
Figure 13:
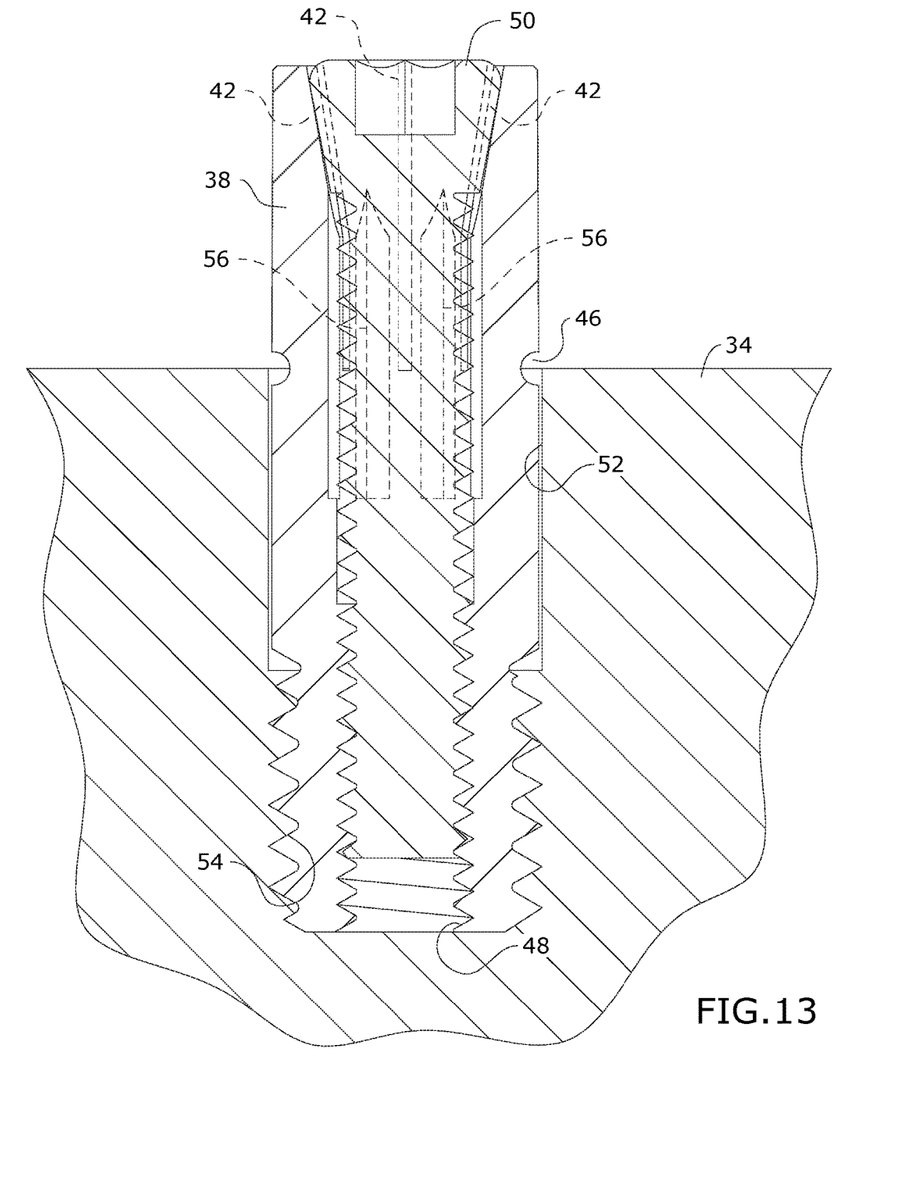
FIG. 13 is a section view the expansion pin, taken along line 13-13 in FIG. 10.

As seen in reference to FIGS. 12 and 13, the interior cavity may also be formed with a polygonal surface 56 that is formed between the tapered surfaces 13 of the gripping fingers 15 and the internal threads 18 of the expansion pin. The polygonal surface 56 may be formed with a rotary broach machine. The polygonal surface 56 facilitates the installation and removal of the expansion pin from the work bench. A tool 58 having a corresponding polygonal shaft may be received within the polygonal surface 56 to permit rotation of the expansion pin from within the interior of the pin. This configuration helps to reduce the incidence of marring of the outer surface of the expansion pin, which may be encountered by the use of pliers or a wrench that would otherwise be applied to the outer surface of the pin. Such marring can be detrimental, particularly in instances were precision tolerances are desired in the workpiece 34.

In some embodiments of the expansion pin, the bottom portion of the pin may include a plurality of external mounting threads 46 extending from the bottom end of the cylindrical body 10. These external mounting threads 46 may be utilized to secure the expansion pin in a threaded aperture of the workbench 28. In other embodiments the external mounting threads 48 may be omitted and the bottom portion of the expansion pin may be received in a non-threaded aperture of the workbench or machining fixture. In this case the external threads of the bolt 12 may be threadingly received within a threaded aperture 54 of the workbench 28.

Similarly, in some embodiments, the expansion pin may have an outer surface of the cylindrical body 10 that is substantially smooth, to facilitate the easy installation and removal of the workpiece 34 from the work station or where it is desirable that the mounting surfaces of the workpiece 34 not be marred or damaged. In other embodiments, the outer surface of the cylindrical body 10 may be provided with a knurled texture which to provide additional gripping force to the workpiece 34. In other instances a knurled portion may be utilized by the machinist to grip the expansion pin by hand for installation or removal of the expansion pin from the workpiece 34.

Figure 4:
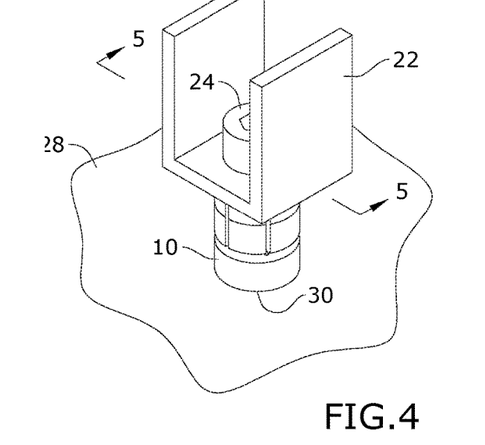
FIG. 4 is a perspective view the expansion pin, shown in the first press-fit installation position.
Figure 5:
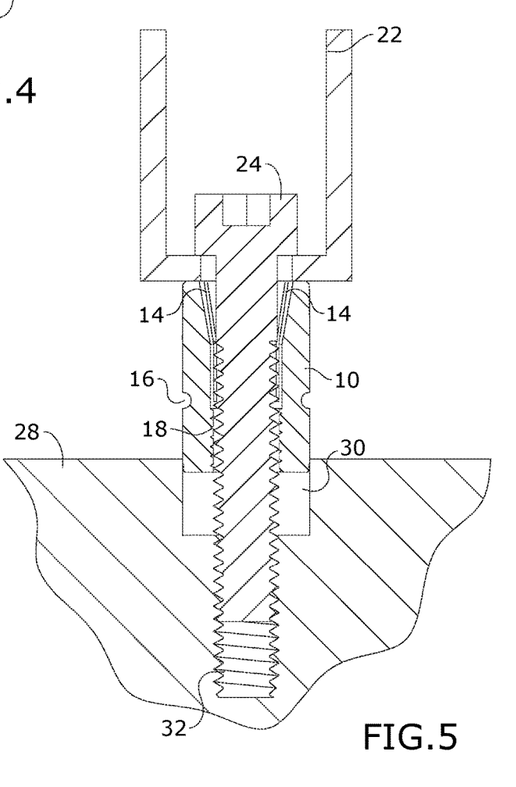
FIG. 5 is a section view the expansion pin, taken along line 5-5 in FIG. 4.
Figure 6:
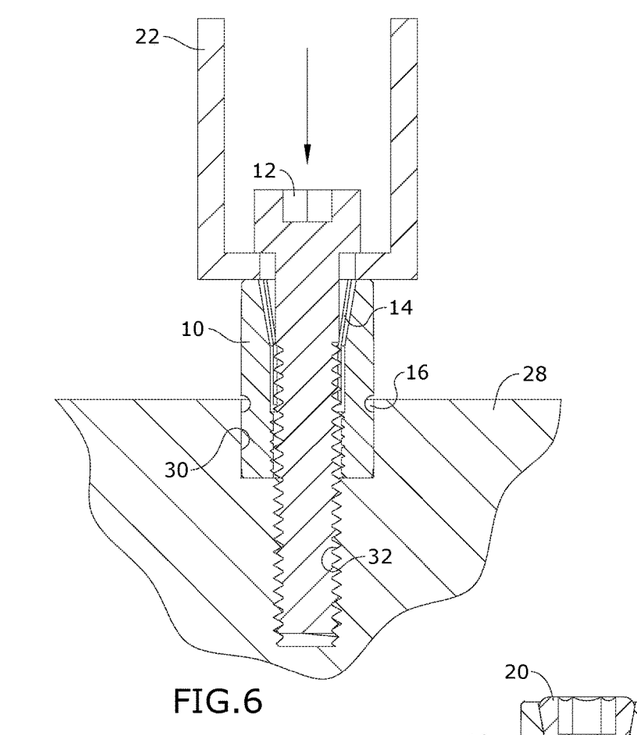
FIG. 6 is a section view the expansion pin, illustrating the use of the tool for installation of an expansion pin.
Figure 7:
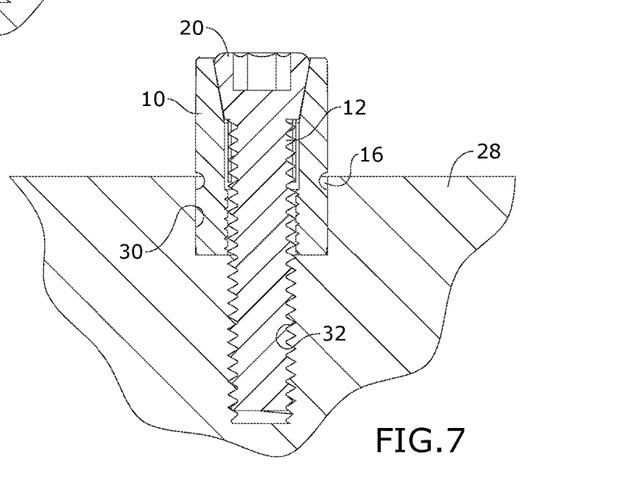
FIG. 7 is a section view the expansion pin, taken along line 7-7 in FIG. 2.
Figure 8:
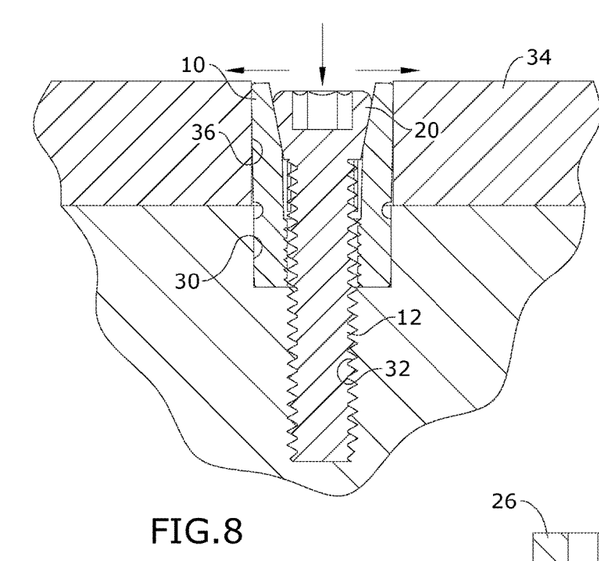
FIG. 8 is a section view the expansion pin, taken along line 8-8 in FIG. 1.
Figure 9:
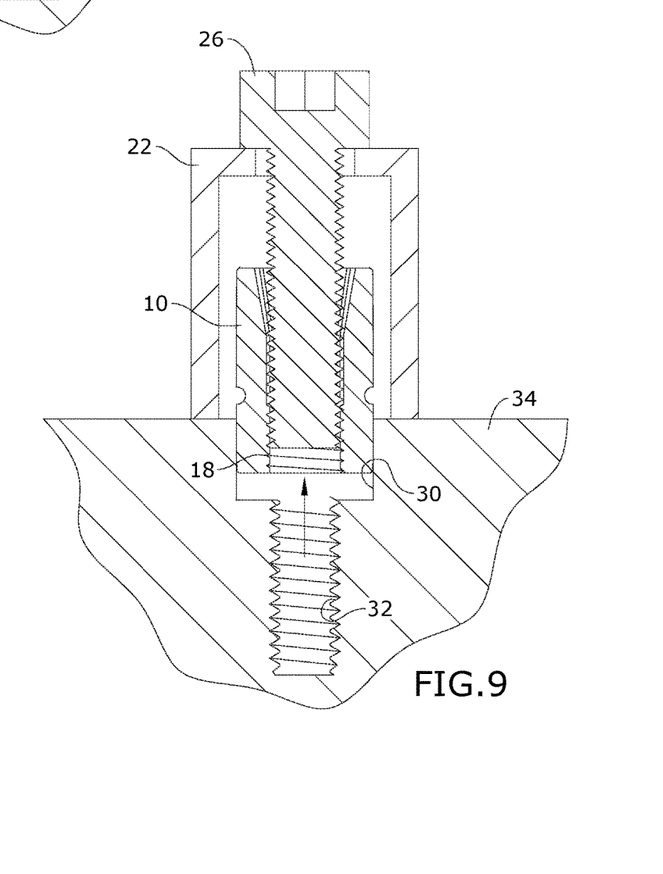
FIG. 9 is a section view the expansion pin, illustrating the removal the expansion with the installation and removal tool.
Figure 10:
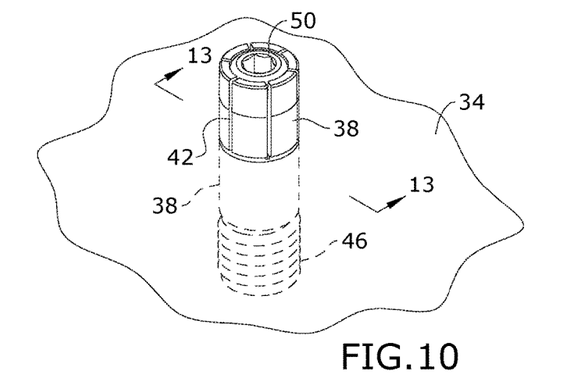
FIG. 10 is a perspective view of an alternate embodiment the expansion pin, shown in an installed position.
Figure 11:
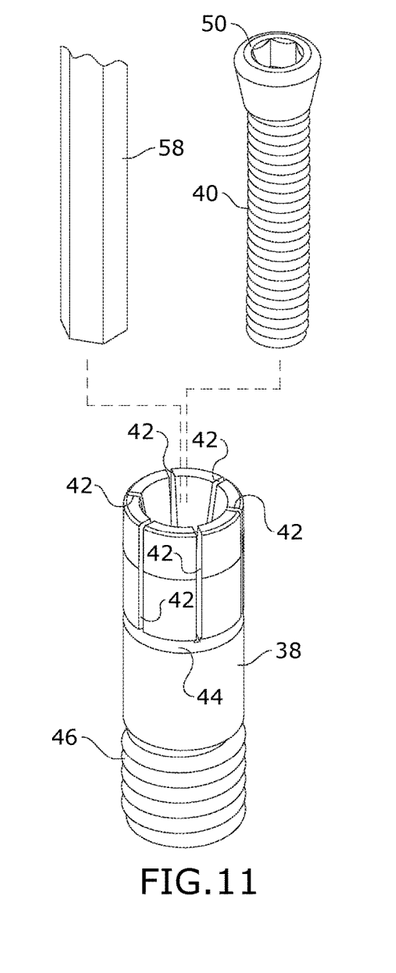
FIG. 11 is an exploded view of an alternate embodiment the expansion pin.

As seen in reference to FIGS. 4-6, an installation and removal tool 22 is illustrated. The tool 22 may be formed as a substantially U shaped member, or channel stock having opposed legs interconnected by a base. An aperture to accommodate the bolt 12 is defined through the base. During installation the tool 22 is placed in an inverted position with the opposed legs pointing upwards. The bolt is threaded for engagement with the internal threads 32 of the work station 28 to draw the expansion pin within the aperture 30. For removal, the tool is placed in an upright position with the opposed legs oriented downwardly. A bolt 26 is received through the tool aperture and threadingly received with the internal threads 18 of the expansion pin. The legs have a width to straddle the expansion pin and have a length longer than that of the expansion pin. As the the bolt 26 is rotated in a tightening direction the expansion pin engages with internal threads 18 of the expansion pin and it is drawn outwardly from the aperture of the work bench 2. The tool 22 may also be formed as a cylindrical body, or cup, with the aperture in the base of the cup.

As will be appreciated, the cylindrical body 10 may be formed in a wide variety of lengths to accommodate the mounting holes of a particular workpiece. It will also be appreciated that while the expansion pin has been described in the context of holding a workpiece to a work platform surface, the expansion pin may also be utilized to join two components. By way of non-limiting example, the expansion pin may be utilized to join components of an assembly, or for mounting component parts together in much the same way as other threaded fasteners, and the like.

It should be understood, of course, that the foregoing relates to exemplary embodiments of the invention and that modifications may be made without departing from the spirit and scope of the invention as set forth in the following claims.

What is claimed is:

1. An expansion pin, comprising:
a cylindrical body having a sidewall and an interior cavity extending from a top end towards a bottom end of the cylindrical body,
an internal thread defined in the interior cavity below the tapered surface portion;
a plurality of slots defined in a top end of the cylindrical body and radially emanating from the interior cavity through the sidewall, the plurality of slots defining a plurality of gripping fingers around a circumference of the sidewall;
the bottom end dimensioned to be received in an opening in a work holding surface;
a tapered surface portion converging inwardly along an interior face of the plurality of gripping fingers; and
a bolt having a frusto-conical head that converges inwardly from a top end of the bolt and terminates at a shank of the bolt, the shank having a plurality of external threads, wherein the frusto-conical head urges the plurality of griping fingers radially outwardly when the bolt is threadingly tightened to draw the frusto-conical head within the tapered surface portion of the cylindrical body, the shank having a length such that the plurality of external threads extend beyond the bottom end of the cylindrical body with the frusto-conical head positioned in abutment within the tapered surface portion of the cylindrical body.

2. The expansion pin of claim 1, further comprising:
an annular expansion groove defined around the cylindrical body at a terminus of the plurality of slots.

3. The expansion pin of claim 1, further comprising:
a plurality of external mounting threads extending from the bottom end of the cylindrical body.

4. The expansion pin of claim 1, further comprising:
a polygonal surface defined in the interior cavity below the tapered surface portion.

5. The expansion pin of claim 4, wherein the polygonal surface is defined between the tapered surface portion and an internal threads defined in the interior cavity.

6. The expansion pin of claim 4, wherein the polygonal surface is configured to receive a tightening tool.

7. The expansion pin of claim 1, wherein the plurality of gripping fingers resiliently return to a resting condition when the bolt is threadingly loosened.

8. The expansion pin of claim 1, wherein an outer surface of the cylindrical body is substantially smooth.

9. The expansion pin of claim 1, wherein an outer surface of the cylindrical body has a knurled texture.

* * * * *